(12) United States Patent
Iihoshi et al.

(10) Patent No.: US 10,465,619 B2
(45) Date of Patent: Nov. 5, 2019

(54) CONTROL DEVICE THAT STOPS FUEL INJECTION TO AN ENGINE DURING COASTING

(71) Applicant: Hitachi Automotive Systems, Ltd., Hitachinaka-shi, Ibaraki (JP)

(72) Inventors: Yoichi Iihoshi, Tokyo (JP); Toshio Hori, Hitachinaka (JP); Yoshihiko Akagi, Hitachinaka (JP); Shinsaku Tsukada, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/737,495

(22) PCT Filed: Jul. 28, 2016

(86) PCT No.: PCT/JP2016/072098
§ 371 (c)(1),
(2) Date: Dec. 18, 2017

(87) PCT Pub. No.: WO2017/043208
PCT Pub. Date: Mar. 16, 2017

(65) Prior Publication Data
US 2018/0171896 A1    Jun. 21, 2018

(30) Foreign Application Priority Data
Sep. 11, 2015 (JP) .................. 2015-179054

(51) Int. Cl.
*F02D 41/00* (2006.01)
*F02M 25/08* (2006.01)
(Continued)

(52) U.S. Cl.
CPC ........... *F02D 41/004* (2013.01); *B60W 10/02* (2013.01); *B60W 10/06* (2013.01);
(Continued)

(58) Field of Classification Search
CPC ........ F02D 41/004; F02D 4/1454; F02D 4/30; F02D 2200/06; F02M 25/08;
(Continued)

(56) References Cited

U.S. PATENT DOCUMENTS

2009/0277426 A1    11/2009 Park

FOREIGN PATENT DOCUMENTS

JP    7-180621 A    7/1995
JP    2007-9853 A    1/2007
(Continued)

OTHER PUBLICATIONS

International Search Report (PCT/ISA/210) issued in PCT Application No. PCT/JP2016/072098 dated Oct. 25, 2016 with English translation (5 pages).
(Continued)

*Primary Examiner* — Huan Le
(74) *Attorney, Agent, or Firm* — Crowell & Moring LLP

(57) ABSTRACT

Introduction of a low fuel consumption technique such as downsizing turbos and idling stop decreases an intake pipe negative pressure (pump loss) of an internal combustion engine, and results in difficulty in emitting (evaporative fuel purge) a volatile fuel (volatile fuel) in a fuel tank by the negative pressure of the intake pipe of the internal combustion engine. A control device includes: a purge control unit which controls a purge valve which emits a volatile fuel of a fuel tank or a canister to an intake pipe of an internal combustion engine; and a power transmission control unit which controls a power transmission mechanism between the internal combustion engine and a drive wheel, and, in a state where the power transmission control unit disconnects a clutch, and the vehicle is coasting, the purge control unit opens the evaporative fuel valve and purges an evaporative fuel to the intake pipe.

15 Claims, 15 Drawing Sheets

(51) Int. Cl.
*F02D 29/02* (2006.01)
*F02D 29/04* (2006.01)
*F02D 29/06* (2006.01)
*B60W 10/02* (2006.01)
*B60W 10/06* (2006.01)
*B60W 30/18* (2012.01)
*F02D 41/30* (2006.01)
*F02D 41/02* (2006.01)
*F02D 41/04* (2006.01)
*F02D 41/08* (2006.01)
*F02D 41/12* (2006.01)
*F02D 41/14* (2006.01)

(52) U.S. Cl.
CPC ....... *B60W 30/18072* (2013.01); *F02D 29/02* (2013.01); *F02D 29/04* (2013.01); *F02D 29/06* (2013.01); *F02D 41/0032* (2013.01); *F02D 41/022* (2013.01); *F02D 41/042* (2013.01); *F02D 41/08* (2013.01); *F02D 41/12* (2013.01); *F02D 41/30* (2013.01); *F02M 25/08* (2013.01); *B60W 2510/0208* (2013.01); *B60W 2510/0647* (2013.01); *B60W 2520/04* (2013.01); *B60W 2540/103* (2013.01); *B60W 2710/021* (2013.01); *B60W 2710/065* (2013.01); *B60W 2710/0622* (2013.01); *B60W 2710/0655* (2013.01); *B60W 2710/305* (2013.01); *F02D 41/1454* (2013.01); *F02D 2200/06* (2013.01); *F02D 2200/602* (2013.01); *Y02T 10/76* (2013.01)

(58) Field of Classification Search
CPC .................. B60W 10/02; B60W 10/06; B60W 30/18072; B60W 2510/0208; B60W 2510/0647; B60W 2520/04; B60W 2540/103; B60W 2710/021; B60W 2710/0622; B60W 2710/065; B60W 2710/0655; B60W 2710/305
See application file for complete search history.

(56) References Cited

FOREIGN PATENT DOCUMENTS

| JP | 2007-239479 A | | 9/2007 |
|---|---|---|---|
| JP | 2009-270562 A | | 11/2009 |
| JP | 2009-281281 A | | 12/2009 |
| JP | 2009281281 A | * | 12/2009 |
| JP | 2012-26332 A | | 2/2012 |

OTHER PUBLICATIONS

Japanese-language Written Opinion (PCT/ISA/237) issued in PCT Application No. PCT/JP2016/072098 dated Oct. 25, 2016 (4 pages).

* cited by examiner

CONTROL DEVICE THAT STOPS FUEL INJECTION TO AN ENGINE DURING COASTING

TECHNICAL FIELD

The present invention relates to a control device, and more particularly, relates to an evaporative fuel purge control technique of an internal combustion engine.

BACKGROUND ART

Introduction of a low fuel consumption technique such as downsizing turbos and idling stop decreases an intake pipe negative pressure (pump loss) of an internal combustion engine, and results in difficulty in emitting (evaporative fuel purge) a volatile fuel (evaporative fuel) in a fuel tank by the negative pressure of the intake pipe of the internal combustion engine. Hence, PTL 1 discloses a method for stopping fuel injection to an internal combustion engine by way of idling stop, and performing evaporative fuel purge during a period in which an internal combustion engine rotational speed becomes a predetermined value or less to realize both of reduction of fuel consumption by way of idling stop and evaporative fuel purge.

CITATION LIST

Patent Literature

PTL 1: Japanese Patent Application Laid-Open No. 2012-26332

SUMMARY OF INVENTION

Technical Problem

However, according to PTL 1, it is only possible to perform evaporative fuel purge during a short period of time before the internal combustion engine actually stops after fuel supply to the internal combustion engine is stopped. There is a concern that, when the evaporative fuel is produced in the fuel tank or the evaporative fuel greatly accumulates in the canister, it is not possible to perform sufficient evaporative fuel purge and the volatile fuel leaks to an atmosphere. Furthermore, cases where vehicles hardly stop on expressways and in suburbs are not taken into account.

The present invention intends to solve the above problem. An object of the present invention is to achieve sufficient evaporative fuel purge while achieving a fuel efficiency effect by stopping an engine by way of idling stop even when the evaporative fuel is frequently generated in a fuel tank or the evaporative fuel greatly accumulates in a canister.

Solution to Problem

A control device includes: a purge control unit which controls a purge valve which emits a volatile fuel of a fuel tank or a canister to an intake pipe of an internal combustion engine; and a power transmission control unit which controls a power transmission mechanism between the internal combustion engine and a drive wheel, and, in a state where the power transmission control unit disconnects a clutch, and the vehicle is coasting, the purge control unit opens the evaporative fuel valve and purges the evaporative fuel to the intake pipe.

Advantageous Effects of Invention

By applying the present invention, it is possible to achieve sufficient evaporative fuel purge while achieving a fuel efficiency effect by stopping an engine by way of idling stop even when an evaporative fuel is frequently generated in a fuel tank frequently or the evaporative fuel greatly accumulates in a canister. In addition, by performing evaporative fuel purge during sailing driving, it is also possible to prevent deterioration of drivability and emission due to evaporative fuel purge.

DESCRIPTION OF EMBODIMENTS

Hereinafter, embodiments of the present invention will be described in detail with reference to the drawings.

First Embodiment

Figure 1:
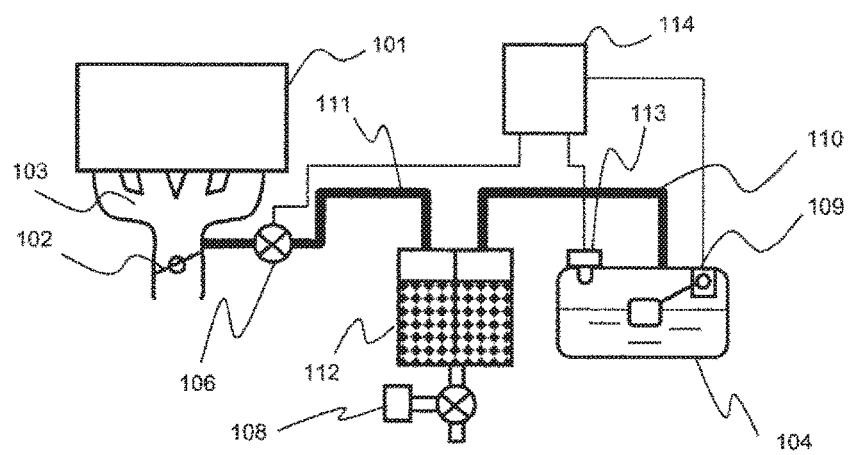
FIG. 1 illustrates an example of a purge control system of an internal combustion engine.

FIG. 1 is a view illustrating an example of a purge control system of an internal combustion engine. In order to prevent an evaporative fuel in a fuel tank 104 from leaking to an atmosphere, an engine controller 114 controls an opening degree of a purge valve 106 and burn the evaporative fuel in an internal combustion engine 101. Therefore, based on values of a fuel level sensor 109 of the fuel tank 104, and a tank temperature/pressure sensor 113 which measures a temperature and a pressure in the fuel tank, the engine controller 114 estimates an evaporative fuel accumulation amount accumulated in a canister 112 during stop of the internal combustion engine or a volatile fuel amount generated in the fuel tank 109 during an operation of the internal combustion engine 101, and, while an opening of a throttle 102 is small and a negative pressure is generated in an intake pipe 103, opens the purge control valve 106 and purges the evaporative fuel to the intake pipe 103 via connecting pipes 110 and 111. In this regard, a drain valve 108 is closed when leakage of an evaporative fuel from the fuel tank is detected. However, purge control is performed during the operation of the engine, and therefore the drain valve 108 is almost in an opened state. A purge system can prevent the evaporative fuel generated in the fuel tank from leaking to the atmosphere. Next, a method for, when controlling an opening of the purge valve 106 of a purge control system in FIG. 1 at a purge valve drive duty and purging the evaporative fuel, performing control to prevent an output of the internal combustion engine from becoming unstable will be described.

Figure 2:
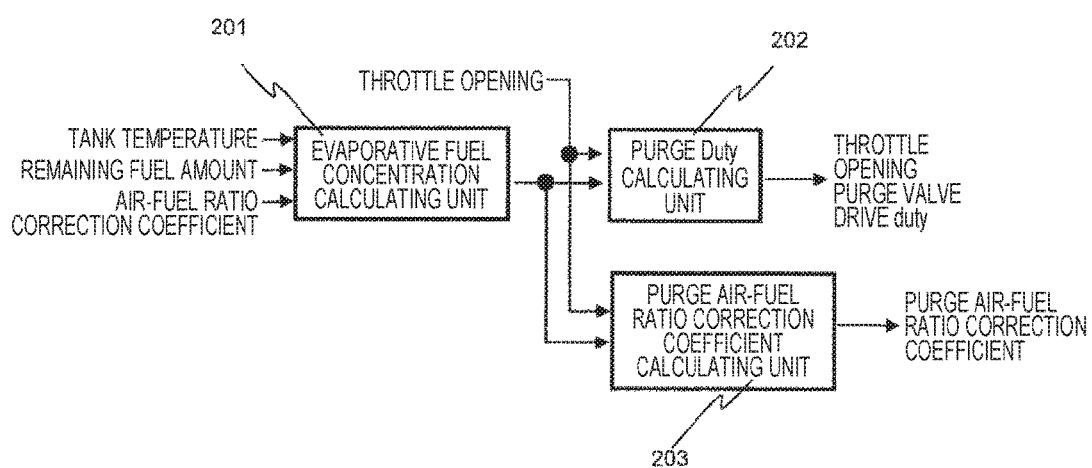
FIG. 2 illustrates an example of a purge control calculation block.

FIG. 2 illustrates an example of a purge control calculation block. An evaporative fuel concentration calculating unit 201 estimates the generation amount of evaporative fuel from the tank temperature and the remaining fuel amount, takes into account a correction coefficient of air-fuel ratio FB control when the purge valve is opened, and calculates a ratio of (evaporative fuel concentration) of the volatile fuel and air included in the purge emitted from the purge valve. A purge duty calculating unit 202 calculates an evaporative fuel flow rate (purge flow rate) which contributes to a target evaporative fuel combustion from the evaporative fuel concentration and the throttle opening to prevent an output of the internal combustion engine and a combustion air-fuel ratio from fluctuating greatly. The purge duty calculating unit 202 outputs the purge valve drive duty to prevent fluctuation of the purge flow rate from making the combustion of the internal combustion engine unstable. In addition, a purge air-fuel ratio correction coefficient calculating unit 203 makes correction to decrease an injector fuel injection amount by the amount that the combustion air-fuel ratio becomes rich by the evaporative fuel. Therefore, the purge air-fuel ratio correction coefficient calculating unit 203 calculates a purge air-fuel ratio correction coefficient (a rate of a decrease in the injector injection fuel) from the evaporative fuel concentration and the throttle opening.

Figure 3:
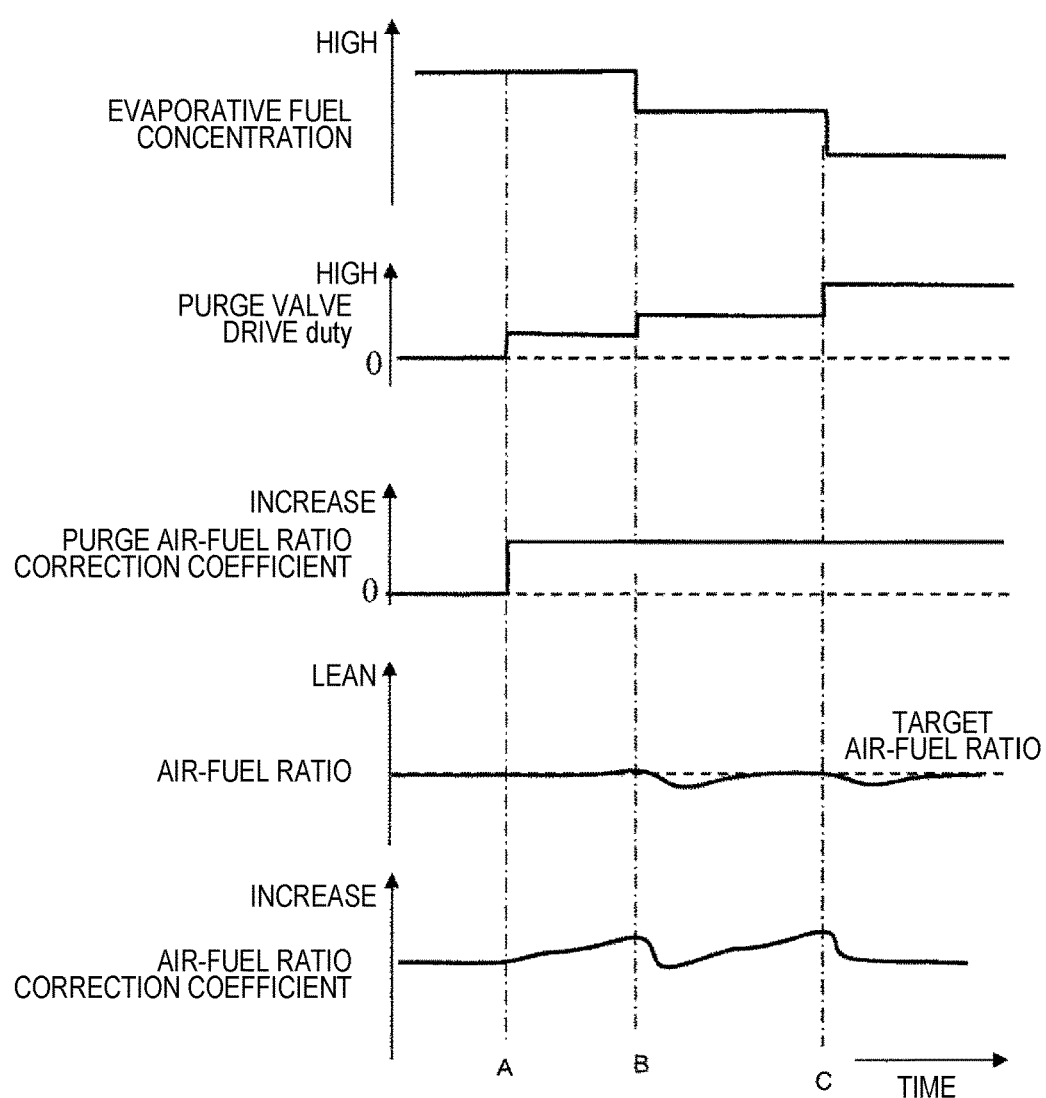
FIG. 3 illustrates an example of a time chart during purge control.

FIG. 3 illustrates an example of a time chart during purge control. The present embodiment describes a case where the throttle opening is constant, a load of the internal combustion engine does not changed, either, the evaporative fuel concentration is high (e.g., 40% or more), the purge valve is opened large at a time, and an engine stalls. At a time A, the purge valve drive duty is increased to start purging the evaporative fuel. When the fuel injection amount of the injector is decreased by the increase (approximately 30% at maximum) in the purge air-fuel ratio correction coefficient, the air-fuel ratio is kept at a stoichiometric, and it can be confirmed that the air-fuel ratio feedback control increases the air-fuel ratio correction coefficient and lowers the evaporative fuel concentration (e.g., when the air-fuel ratio correction coefficient changes by approximately 10% on average), the evaporative fuel concentration is reduced, and the purge valve 106 is opened to control the purge flow rate to a predetermined value. Generally, the purge flow rate is determined by the throttle opening and the rotational speed of the internal combustion engine. Especially when the idling driving while the vehicle stops increases the purge flow rate, the evaporative fuel concentration is not constant, and therefore rotation fluctuates significantly. In the worst case, there is a risk of an accidental fire. Therefore, the present embodiment discloses a solution which uses the idling driving (sailing idling driving) during coasting/deceleration.

Figure 4:
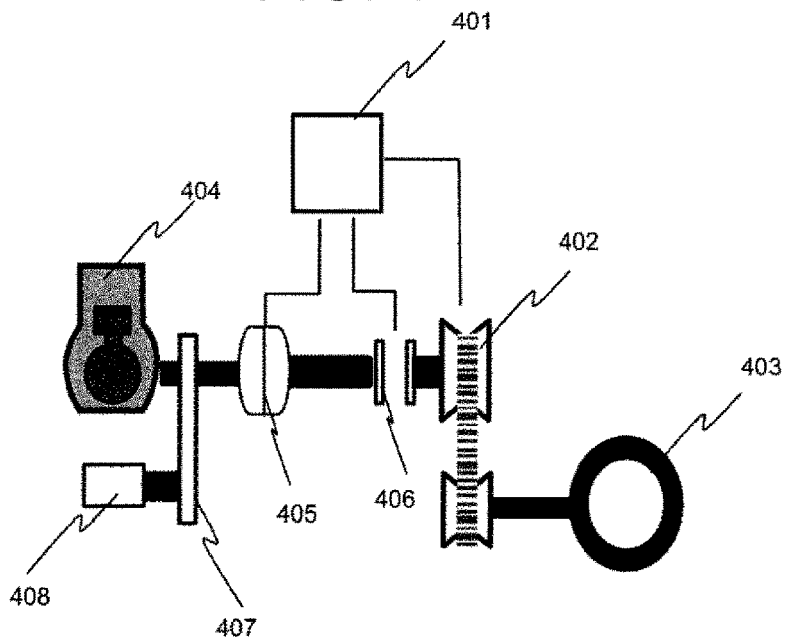
FIG. 4 illustrates an example of a power transmission control system which realizes the present invention.

FIG. 4 illustrates an example of a power transmission control system which performs sailing idling driving. The power generated by an internal combustion engine 404 transmits to a drive wheel 403 via a torque converter 405, a clutch 406, and a CVT transmission 402. During the sailing idling driving, the power of the internal combustion engine 404 does not transmit to the drive wheel 403, and is used to coast or decelerate the vehicle. To transition to the sailing idling driving, a transmission controller 401 disconnects the clutch 406 while the drive wheel 403 is rotating (driving), and the internal combustion engine 404 is controlled to the idling rotational speed. A compressor 408 of a generator and an air-conditioner is driven by a belt 407 even during the sailing driving. Therefore, by controlling these operating loads, it is possible to increase the internal combustion engine load during the sailing idling driving. The present embodiment will be described by using the CVT transmission. However, the present invention can be realized by using a transmission such as AMT or MT.

Figure 5:
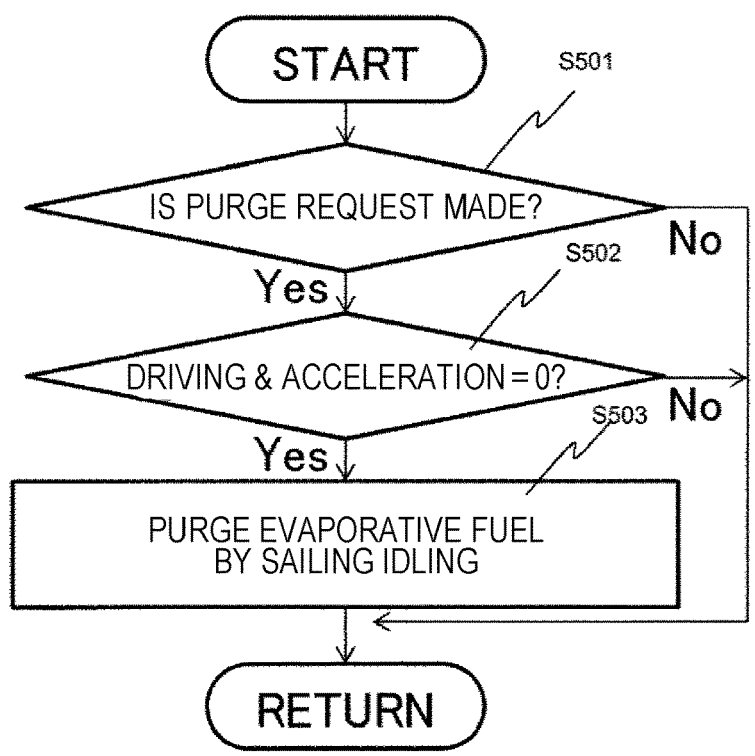
FIG. 5 illustrates an example of a flowchart for realizing the present invention.

FIG. 5 illustrates an example of a flowchart for realizing the present embodiment. In step S501, whether or not a purge request is made is decided. For example, whether or not the purge request is made is decided based on whether or not the evaporative fuel concentration calculated by the engine controller 114 in FIG. 1 is higher than a predetermined value. When the purge request is made, the flow moves to step S502. In step S502, in case of a sailing condition (e.g., the vehicle is driving and the accelerator opening is 0), the vehicle transitions to the coasting/decelerating state. That is, when the value of the accelerator opening sensor becomes the predetermined value or less as the sailing driving condition, it is desirable that the power transmission control unit disconnects the clutch 406 and the vehicle coasts. A sailing condition different from step S502 is a request from cruise control. More specifically, while the cruise control is executed, a vehicle acceleration/deceleration command may be used in place of the accelerator opening. For example, at a time when there is no acceleration command, it may be determined that the sailing condition holds. If the sailing condition holds in step S502, the flow moves to step S503. In step S503, the transmission controller 401 in FIG. 4 performs control to transition to the sailing idling driving. The purge control as described in FIGS. 1 to 4 is performed.

As described above, the control device according to the present embodiment includes a purge control unit (engine controller 114) which controls the purge valve 106 which emits a volatile fuel of the fuel tank 104 or the canister 112 to the intake pipe 103 of the internal combustion engine 101, and a power transmission control unit (transmission controller 401) which controls a power transmission mechanism (clutch 406) between the internal combustion engine 101 and the drive wheel 403. Further, in a state where the power transmission control unit disconnects the power transmission mechanism (the clutch 406 or a lock-up clutch of the torque converter 405) and the vehicle is coasting, the purge control unit (engine controller 114) opens the purge valve 106 and performs control to emit the evaporative fuel to the intake pipe 103. This evaporative fuel is desirably controlled to be emitted to the intake pipe 103 in a state where the power transmission control unit disconnects the power transmission mechanism and the vehicle is coasting and when an evaporative fuel emission request is made.

A signal of the evaporative fuel emission request is desirably set to be sent when at least one of a volatile fuel concentration value in the fuel tank, a volatile fuel accumulation value of the canister and an evaporative fuel concentration value emitted from the purge valve becomes a predetermined value or more.

In the present embodiment, the engine controller 114 and the transmission controller 401 are described as separate components. However, these controllers may be integrated.

In a state where the internal combustion engine control unit (engine controller 114) according to the present embodiment performs sailing idling driving for maintaining a rotational speed of the internal combustion engine 101 at a predetermined rotational speed during the coasting, and the vehicle is coasting, the purge control unit (engine controller 114) opens the purge valve 106 and performs control to emit the evaporative fuel to the intake pipe 103. It is desirable to set this predetermined rotational speed higher than the idling rotational speed while the vehicle stops.

As a result, when the vehicle coasts and decelerates, it is possible to emit the evaporative fuel, and realize both reduction of fuel consumption and purge the volatile fuel by way of idling stop. Next, the purge control according to the present invention will be described in more detail with reference to FIGS. 6 to 11.

Figure 6:
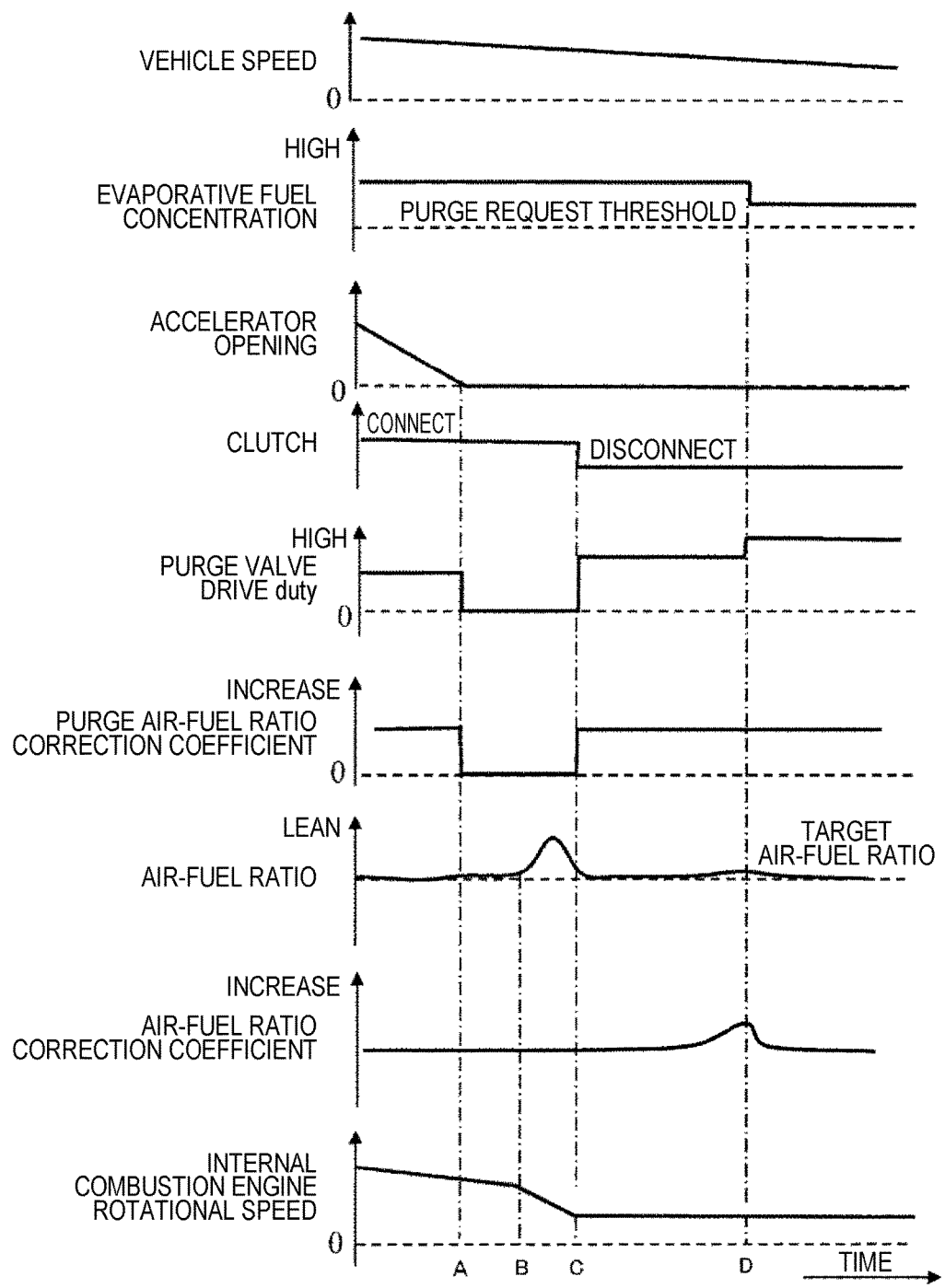
FIG. 6 illustrates an example of a purge control time chart during sailing idling.

FIG. 6 illustrates an example of a purge control time chart during sailing idling. Here, a control method for starting purging the evaporative fuel during the sailing idling driving will be described. When the vehicle speed tends to decelerate and the evaporative fuel concentration is higher than the purge request threshold (e.g., 100), it is decided that a purge request is made, and at a time when the accelerator opening becomes 0 and the sailing condition holds as at time A, a transition is made to the sailing idling driving. In this case, in order to quickly decrease the engine rotational speed to the idling rotational speed, the purge drive duty is set to 0 to close the purge valve is closed. At a time B when the purge stops, the fuel injection is stopped. Next, at a time C when combustion of the internal combustion engine stops and the rotational speed sufficiently lowers, the clutch is disconnected. The fuel is injected again to transition to the sailing idling driving. Subsequently, similar to description with reference to FIG. 3, the evaporative fuel concentration is corrected according to the degree of increase in the air-fuel ratio correction coefficient, and the purge valve drive duty is controlled to purge the evaporative fuel. According to this control, a transition to the sailing idling is made by burning the purge fuel and transitioning to sailing idling. Consequently, it is possible to suppress emission deterioration due to the remaining purge fuel before the transition to sailing idling, and rotation fluctuation at the start of sailing idling driving.

Figure 7A:
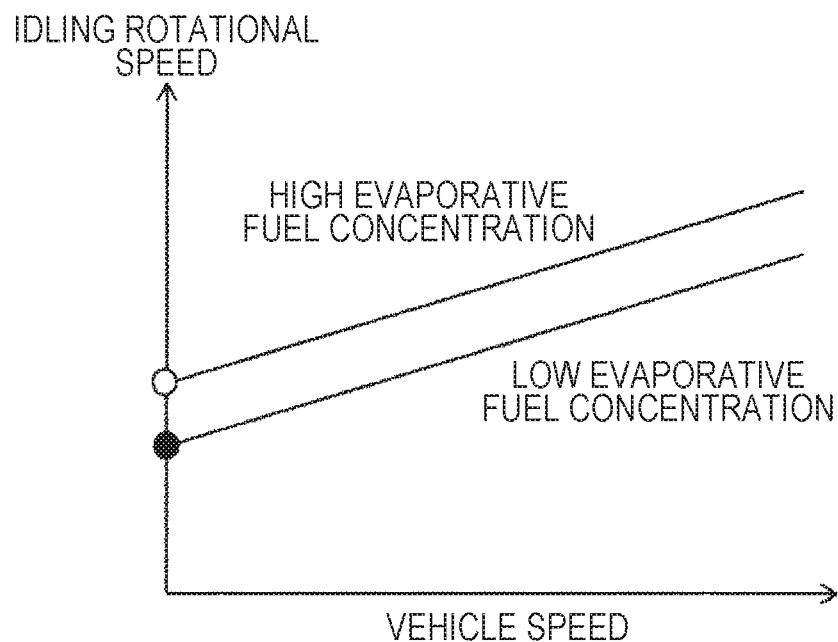
FIG. 7A illustrates an example of a method for setting an internal combustion engine rotational speed during sailing idling.
Figure 7B:
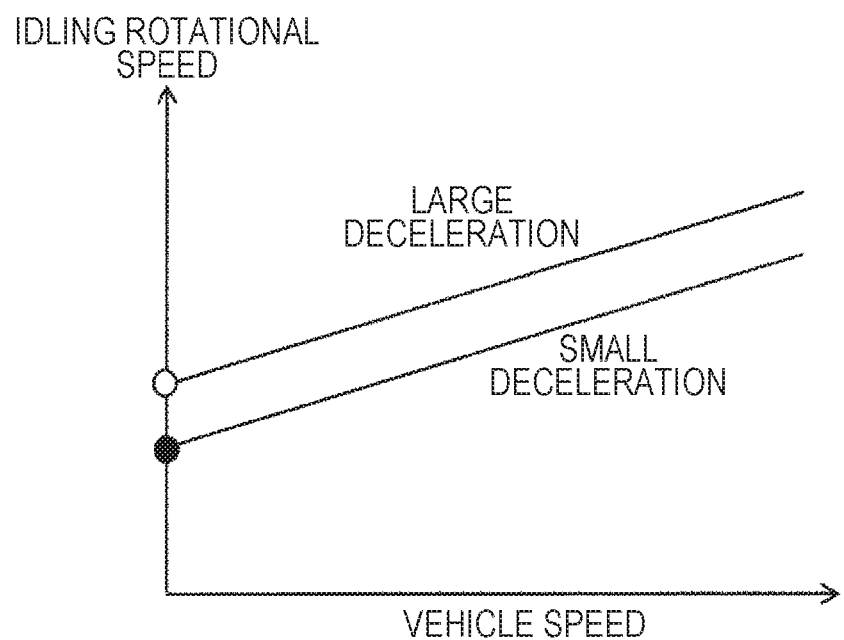
FIG. 7B illustrates an example of a method for setting the internal combustion engine rotational speed during the sailing idling.

FIG. 7 illustrates an example of rotational speed setting of the internal combustion engine during the sailing idling driving. During the sailing idling driving, by increasing the load of the internal combustion engine or increasing the rotational speed according to the evaporative fuel concentration, it is possible to actively control the purge flow rate. For example, when the evaporative fuel concentration is high as illustrated in FIG. 7-*a*, and when the idling rotational speed is increased, if the evaporative fuel concentration is high, it is possible to purge a more volatile fuel. Furthermore, by changing the idling rotational speed according to the vehicle speed, it is possible to purge the more evaporative fuel without making a driver feel strange. From a viewpoint of setting the idling rotational speed which does not make the driver feel strange, when the deceleration is larger as illustrated in FIG. 7-*b*, the idling rotational speed may be increased. According to this setting, by setting the idling rotational speed to the same speed as the engine brake, it is possible to increase the purge flow rate by simulating the rotational speed during engine braking.

Figure 8A:
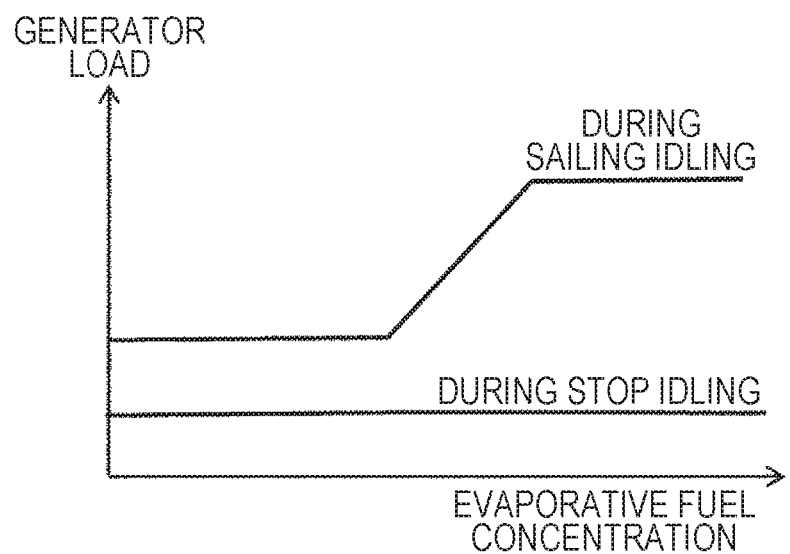
FIG. 8A illustrates an example of a method for setting an internal combustion engine load during the sailing idling.
Figure 8B:
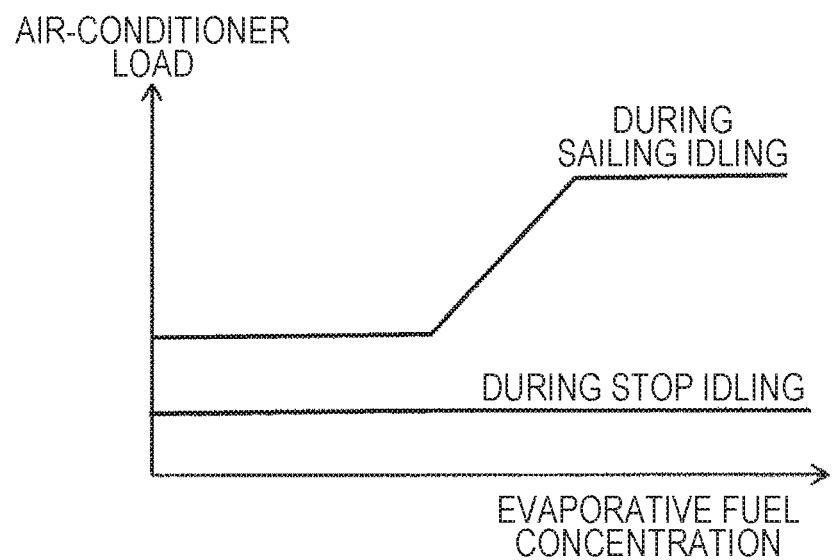
FIG. 8B illustrates an example of the method for setting the internal combustion engine load during the sailing idling.

FIG. 8 illustrates an example of a method for setting a load of the internal combustion engine during the sailing idling driving. In FIG. 8-*a*, by increasing the generator load during sailing idling compared to vehicle stop idling, it is possible to increase the load of the internal combustion engine, and purge the more evaporative fuel. By setting the load according to the evaporative fuel concentration, it is also possible to minimize deterioration of fuel efficiency due to the increase in the generator load. By accumulating generated power in the battery or causing another auxiliary device such as an air-conditioner described next to consume the power, it is possible to minimize deterioration of the fuel efficiency. In addition, in FIG. 8-*a*, an upper limit and a lower limit are set to the generator load during sailing idling. When the evaporative fuel concentration is smaller than the predetermined value, the load is kept at the lower limit, and, when the evaporative fuel concentration is larger than the predetermined value, the load is kept at the upper limit. By changing the load upper limit, the lower limit and the predetermined value, it is possible to adjust fuel economy and adjust evaporative fuel purge. By setting a predetermined value for increasing the generator load to a lower evaporative fuel concentration, it is possible to purge the more evaporative fuel. In FIG. 8-*b*, by increasing an air-conditioning load during sailing idling compared to vehicle stop idling, it is possible to increase the load of the internal combustion engine, and purge the more evaporative fuel. In case of an electric air-conditioner compressor, it is possible to change the load of the internal combustion engine by increasing the above-mentioned generator load. In case of the mechanical air compressor, it is possible to change the load of the internal combustion engine by operating the compressor.

Figure 9:
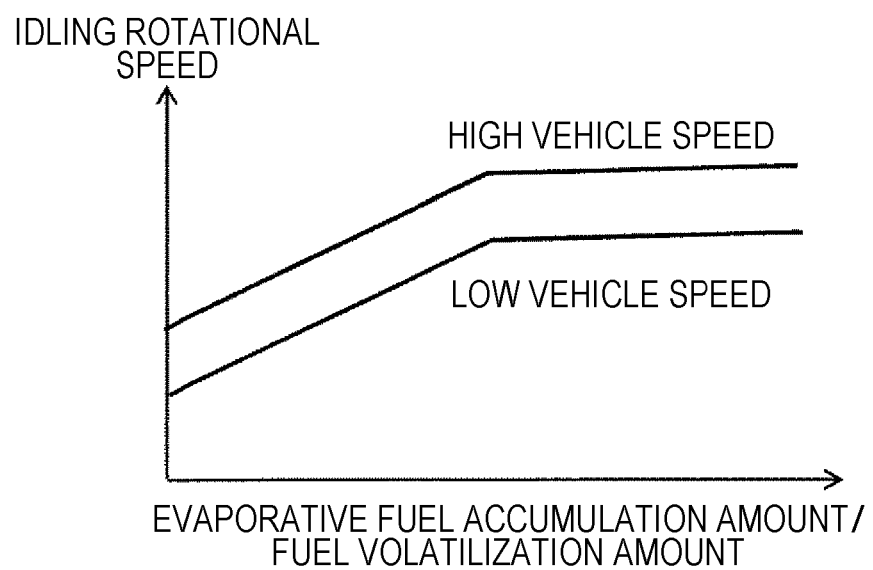
FIG. 9 illustrates another example of the method for setting the internal combustion engine rotational speed during the sailing idling.

FIG. 9 illustrates another example of a method for setting the rotational speed of the internal combustion engine during sailing idling. In FIG. 7-*a*, the idling rotational speed is set according to the evaporative fuel concentration. However, by setting the idle rotational speed based on the evaporative fuel accumulation amount of the canister and the fuel volatilization amount of the fuel tank instead of the evaporative fuel concentration, it is possible to realize the present invention. That is, the internal combustion engine control device (engine controller 114) according to the present embodiment estimates or measures the evaporative fuel accumulation amount of the canister or the evaporative fuel volatilization amount of the fuel tank, and controls the idling rotational speed according to the estimation or the measurement value. Here, by setting the idling rotational speed according to the vehicle speed instead of the deceleration illustrated in FIG. 7-*b*, it is possible to increase the purge flow rate without making the driver feel strange. Further, it is possible to adjust fuel consumption and purge according to the upper limit of the idling rotational speed. For example, to prioritize the improvement of fuel efficiency of the vehicle over the evaporative fuel purge, the upper limit of the rotational speed may be lowered.

Figure 10:
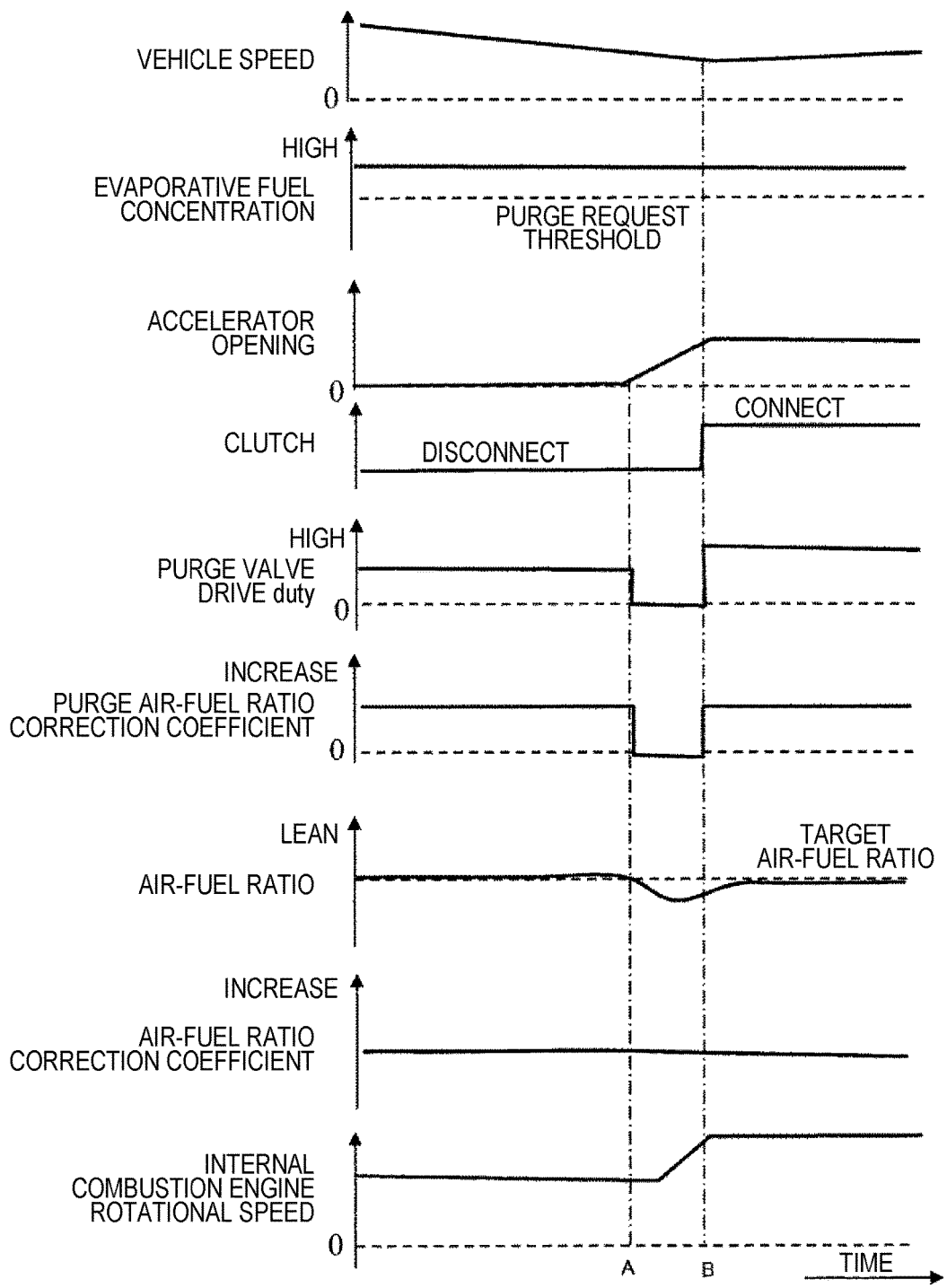
FIG. 10 illustrates another example of a purge control time chart during the sailing idling.

FIG. 10 illustrates another example of a purge control time chart during the sailing idling. Here, an example where the evaporative fuel purge during the sailing idling driving is ended in response to a driver's acceleration request will be described. It is necessary to synchronize the engine rotational speed with the wheel speed side rotational speed in order to connect the clutch during a transition from sailing to acceleration. Therefore, when the driver applies the accelerator at the time A, the purge valve is closed to reduce the evaporative fuel which becomes a disturbance for synchronization with the rotational speed. After the clutch is connected at the time B, the purge valve is opened again. Even when the more evaporative fuel is purged during the sailing driving, this control does not make combustion of the internal combustion engine unstable and the vehicle can transition to the acceleration state.

Figure 11:
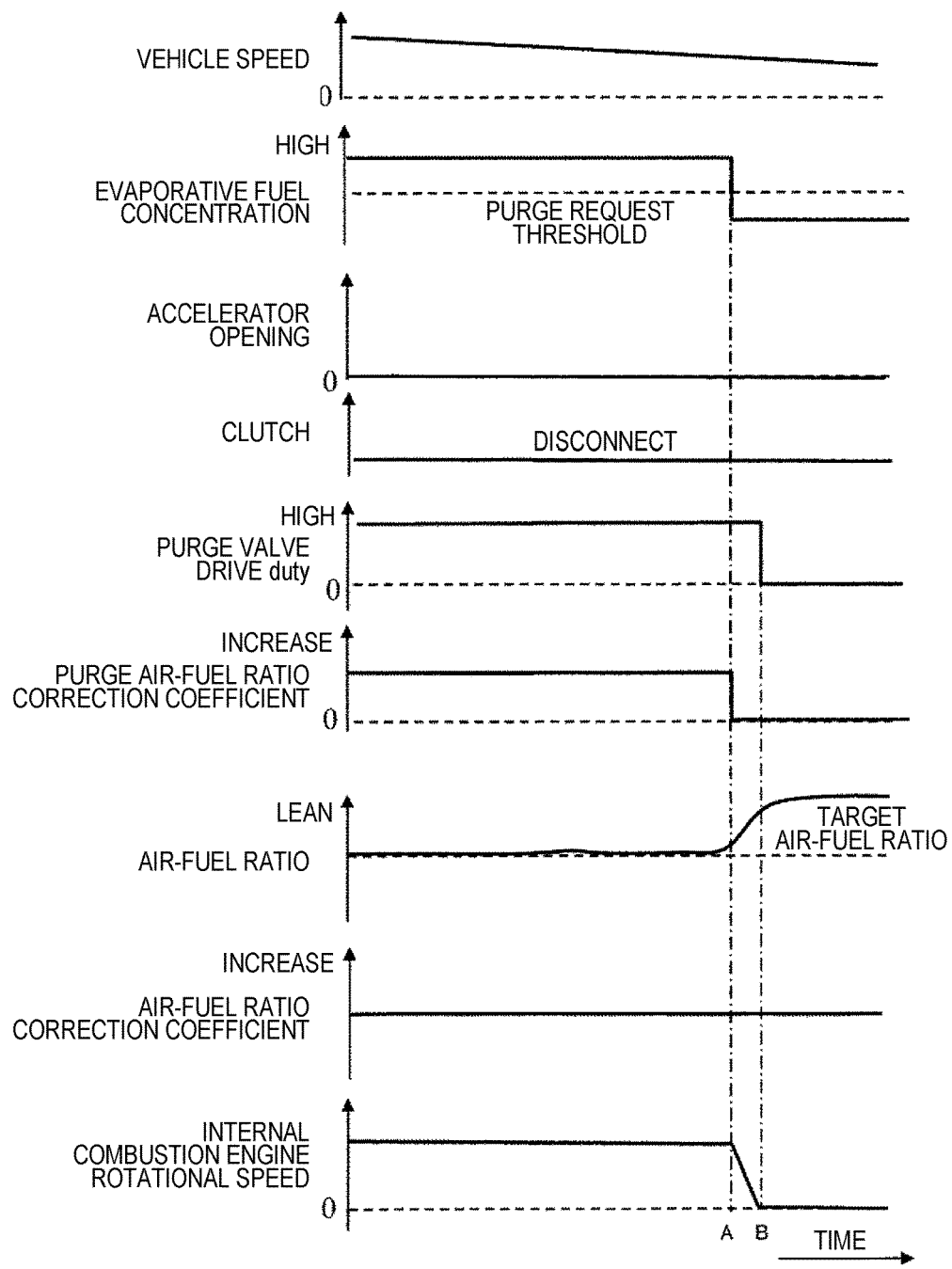
FIG. 11 illustrates another example of the purge control time chart during the sailing idling.

FIG. 11 illustrates another example of the purge control time chart during the sailing idling. Here, the control in case where the purge request is not met and canceled, and a transition is made from the sailing idling driving to the sailing stop driving will be described. When the evaporative fuel concentration goes below the purge request threshold at the time A, and the purge request is canceled, the transition to the sailing stop driving for stopping the engine during sailing improves fuel efficiency. That is, the internal combustion engine control unit (engine controller 114) according to the present embodiment performs sailing stop driving to stop fuel injection to the internal combustion engine 101 during coasting. In this case, until the time B when there is no negative pressure from stop of the fuel injection to the internal combustion engine 101 to stop of rotation of the internal combustion engine, the purge valve is opened. Consequently, it is possible to make the air-fuel ratio in the catalyst rich, and prevent emission of NOx to the atmosphere when the engine is started to accelerate.

Second Embodiment

Figure 12:
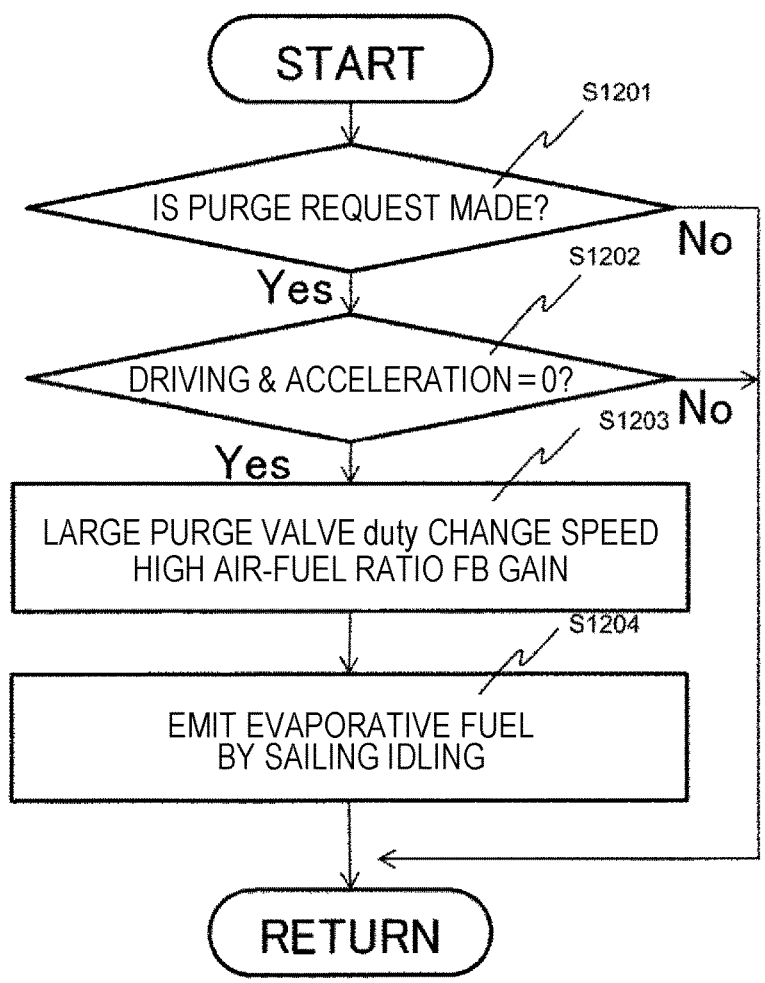
FIG. 12 illustrates another example of a flowchart for realizing the present invention.

FIG. 12 illustrates another example of a flowchart for realizing the present invention. The difference from FIG. 5 is step S1203, and the purge valve duty change rate and a gain of the air-fuel ratio feedback (air-fuel ratio FB) are made large compared to vehicle stop idling. That is, the internal combustion engine control unit (engine controller 114) increases an increase speed of the opening degree of the purge valve 106 compared to the idling driving while the vehicle stops. Alternatively, the internal combustion engine control unit (engine controller 114) increases the air-fuel ratio feedback response driving speed of the internal combustion engine 101 compared to the idling driving while the vehicle stops.

Figure 13:
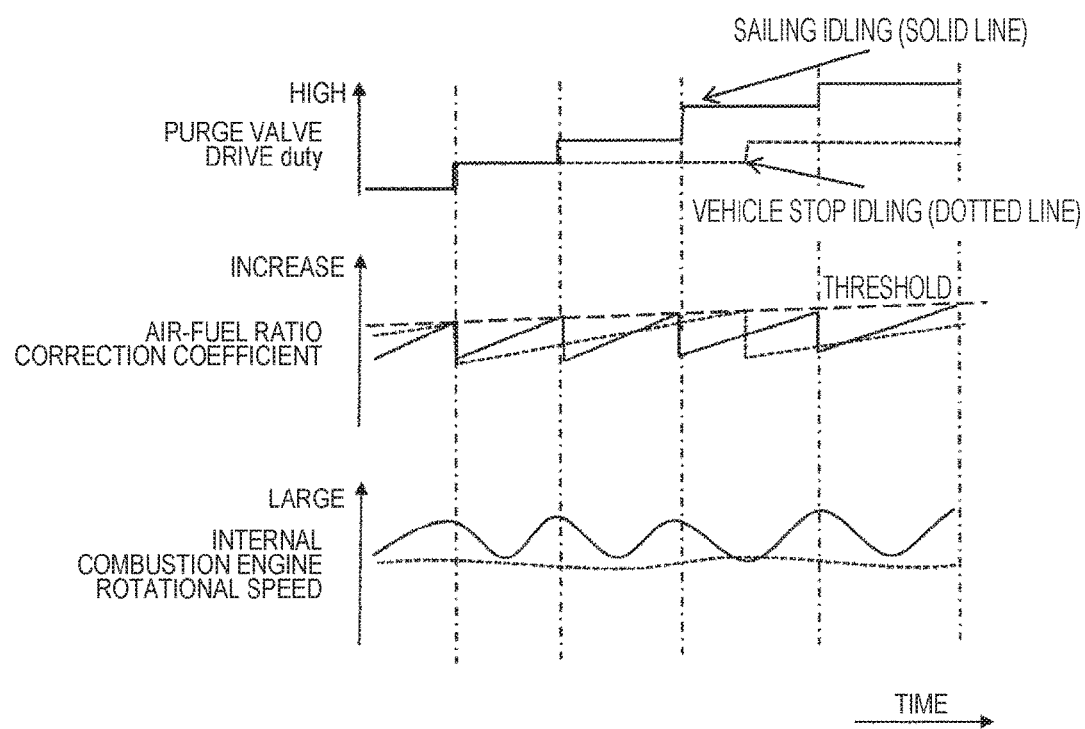
FIG. 13 illustrates another example of the purge control time chart during sailing idling.

FIG. 13 is another example of the purge control time chart during the sailing idling. Here, a behavior during sailing idling is indicated by the solid line, a behavior during vehicle stop idling is indicated by the dotted line, and these behaviors are overlaid and compared. During sailing idling, it is possible to open the purge valve earlier compared to vehicle stop idling. This is because reflected heat from a ground is small a little during sailing compared to a time when the vehicle stops, and the fuel tank is cooled by a traveling wind and the amount of volatile fuel from the fuel tank is small. This control results in increasing and significantly fluctuating the internal combustion engine rotational speed during sailing idling compared to vehicle stop idling. It is possible to set the purge control duty change speed and the control gain of the air-fuel ratio control FB to such a degree that the driver does not notice during sailing. As a result, it is possible to purge the evaporative fuel during vehicle stop idling.

Third Embodiment

Figure 14:
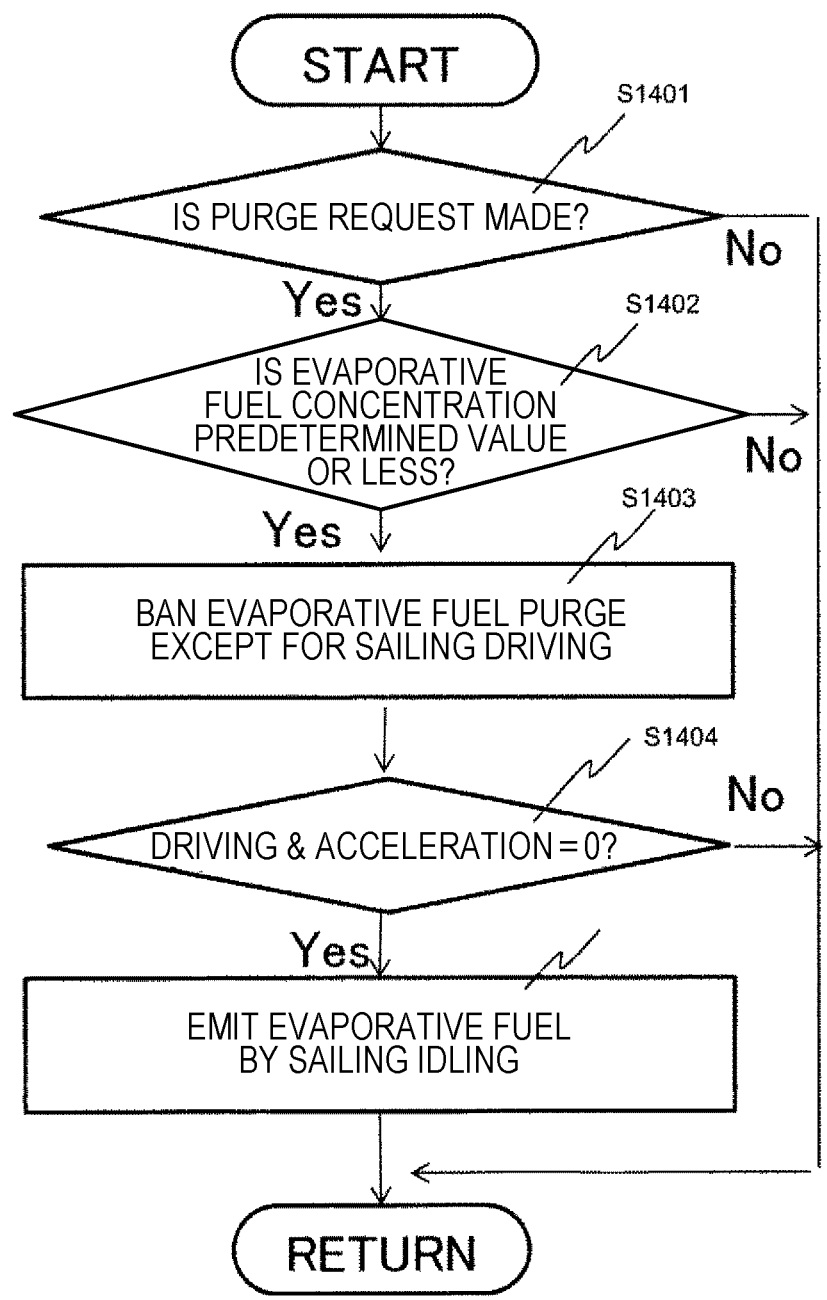
FIG. 14 illustrates another example of a flowchart for realizing the present invention.

FIG. 14 illustrates another example of a flowchart for realizing the present invention. The difference from FIG. 5 is that, when the purge concentration is the predetermined value or less in step S1402, the flow moves to step S1403 to ban evaporative fuel purge except for the sailing driving.

Figure 15:
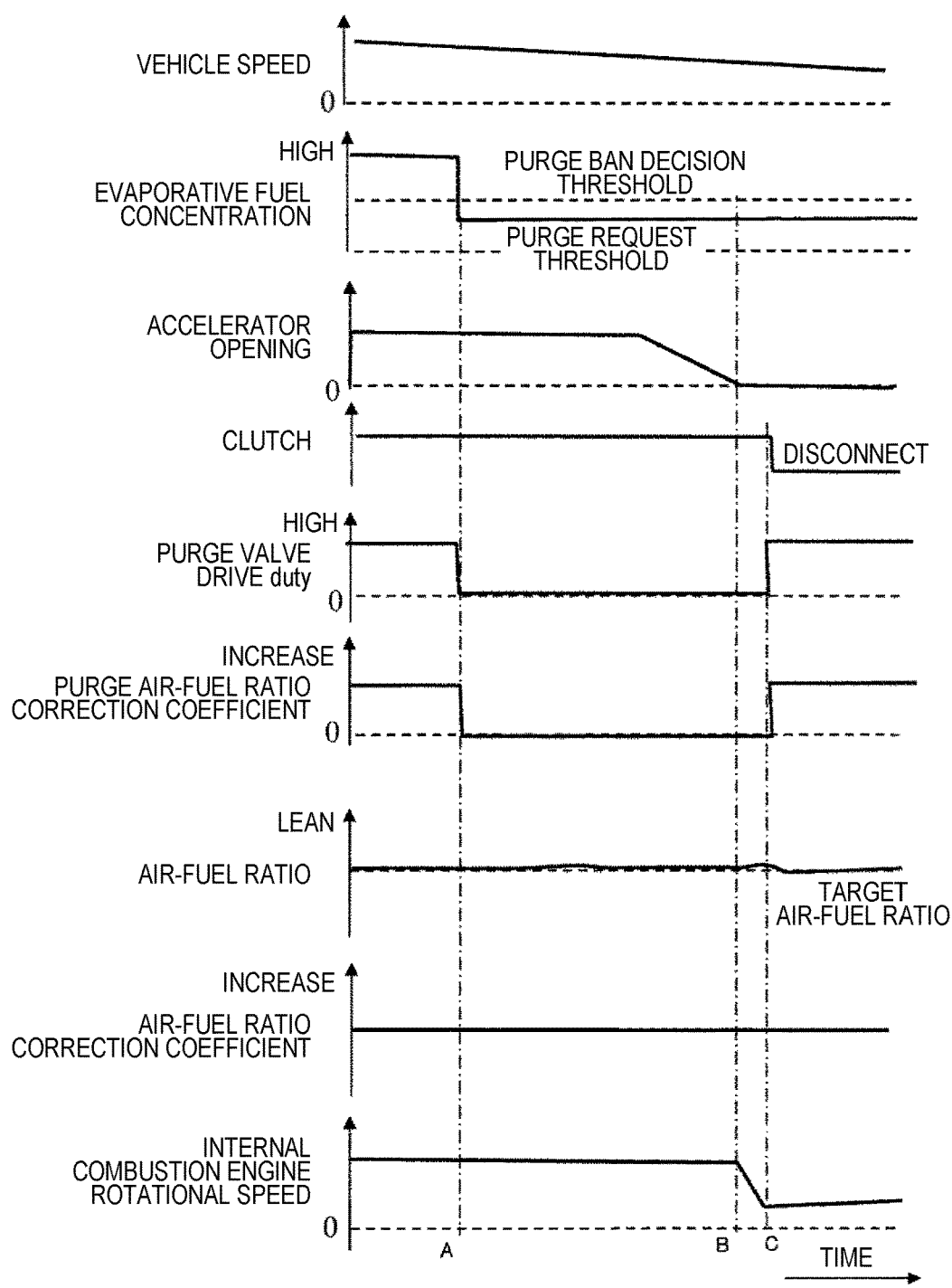
FIG. 15 illustrates another example of the purge control time chart during the sailing idling.

FIG. 15 illustrates another example of the purge control time chart during the sailing idling. At the time A when the evaporative fuel concentration goes below the purge ban decision threshold during driving (vehicle speed >0), purging except for the sailing driving is banned. The purge valve drive duty and the purge air-fuel ratio correction coefficient become zero. Thereafter, when the sailing condition (vehicle speed>0, and accelerator opening=0) holds at the time B, and when the idling rotational speed is controlled at the time C, the purge valve duty and the purge air-fuel ratio correction coefficient are controlled to purge the evaporative fuel. When the sailing condition does not hold, the purge valve 106 is closed.

When the volatile fuel concentration value in the fuel tank, the volatile fuel accumulation value of the canister or a value of the evaporative fuel concentration emitted from the purge valve becomes the predetermined value or less set higher than an evaporative fuel emission request, the internal combustion engine control unit (engine controller 114) according to the present embodiment bans evaporative fuel purge except for the sailing driving. According to the present configuration, when it is not necessary to quickly purge the evaporative fuel, by banning purge except for the sailing driving, it is possible to prevent deterioration of emission and drivability due to purge.

Fourth Embodiment

Figure 16:
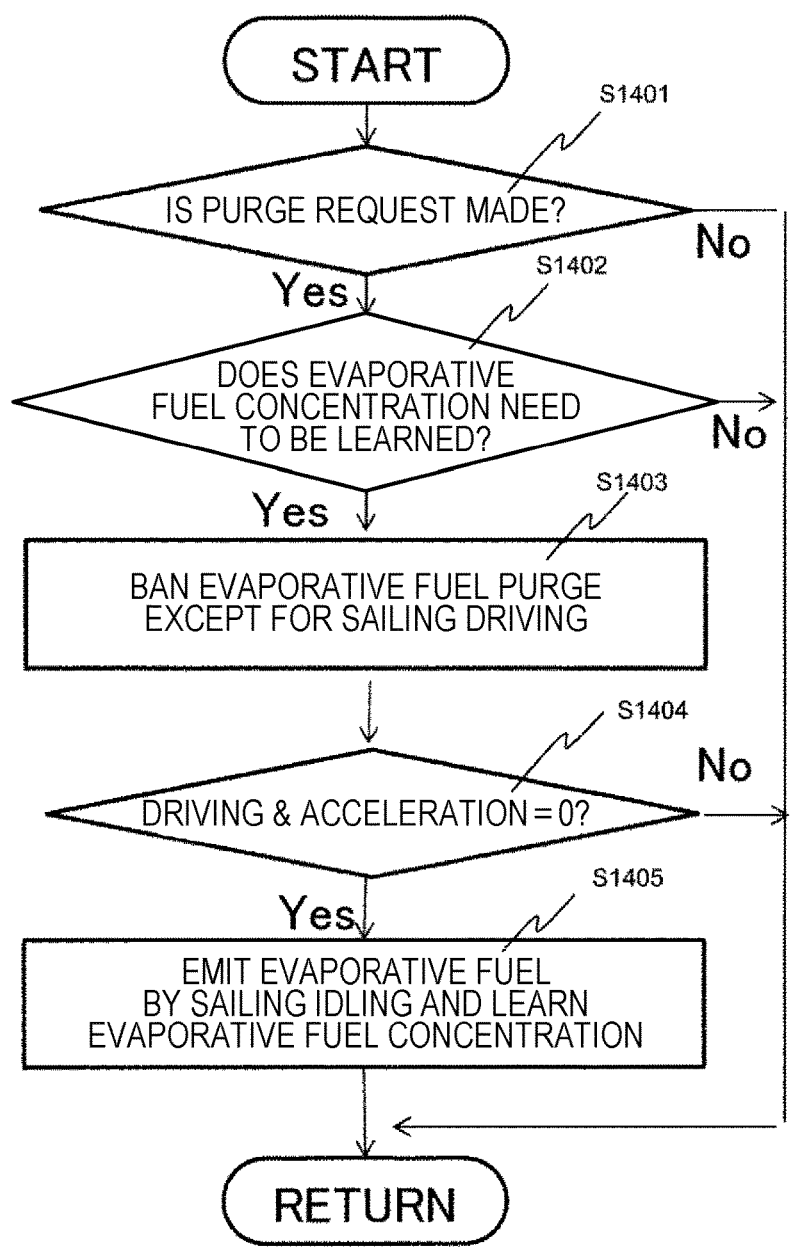
FIG. 16 illustrates another example of the flowchart for realizing the present invention.

FIG. 16 illustrates another example of a flowchart for realizing the present invention. The difference from FIG. 5 is that whether or not the evaporative fuel concentration needs to be learned is decided in step S1402, evaporative fuel purge except for the sailing driving is banned in step S1403 if necessary, and, when the sailing condition holds in step S1404, the evaporative fuel concentration is learned during the sailing idling driving in step S1405.

Figure 17:
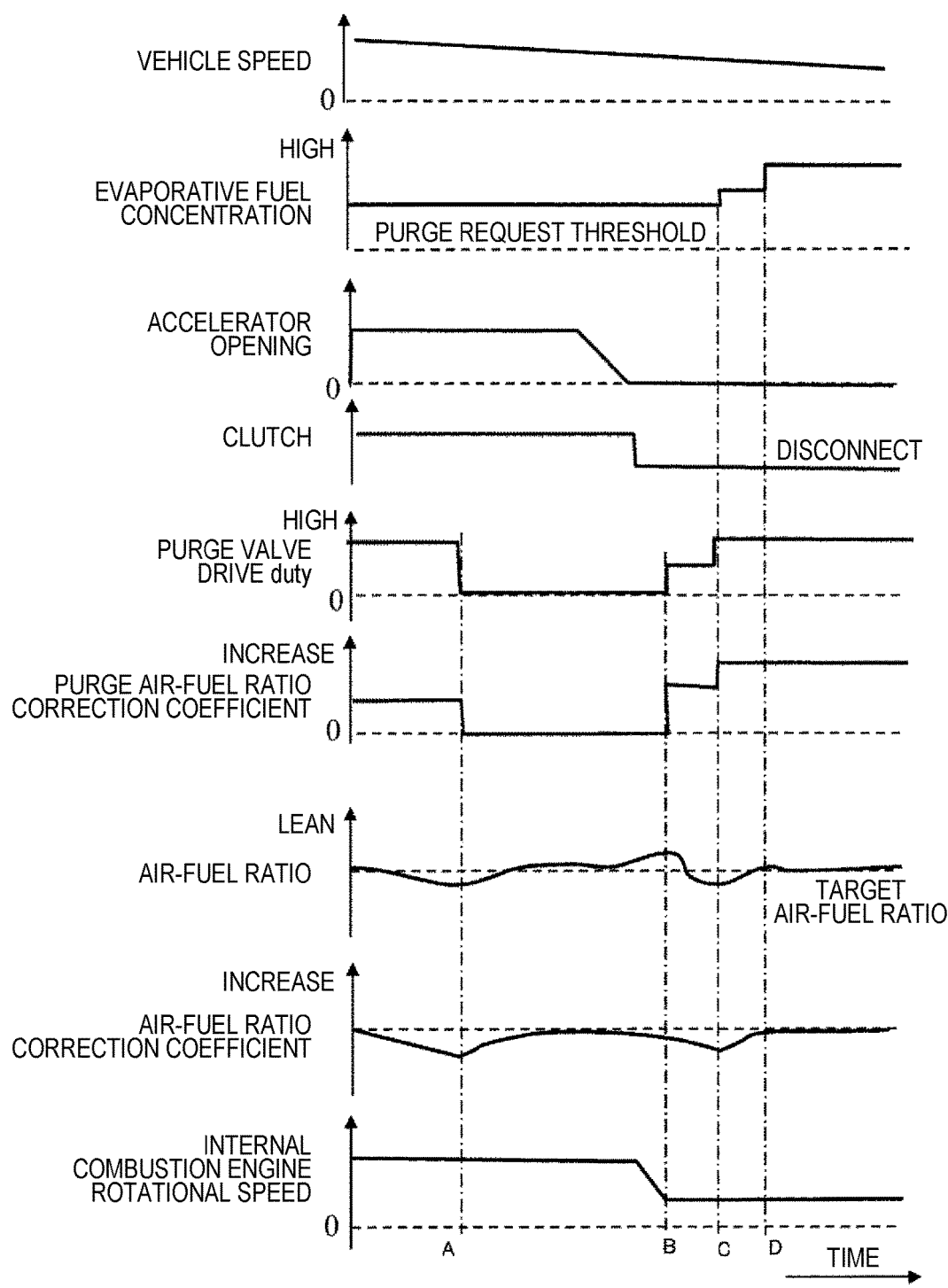
FIG. 17 illustrates another example of the purge control time chart during the sailing idling.

FIG. 17 illustrates another example of the purge control time chart during the sailing idling. A great shift of the air-fuel ratio from the target air-fuel ratio while evaporative fuel purge is performed during driving at the time A triggers the evaporative fuel concentration learning request. For this reason, the evaporative fuel purge is banned in the interval from the time A to B (the purge valve duty is zero). From the time B when the sailing idling is started, the volatile fuel is purged, and the evaporative fuel concentration is learned. Here, the air-fuel ratio is richer than the target air-fuel ratio at the time C. Therefore, the evaporative fuel concentration is corrected to the higher side and learned. At a time D, the air-fuel ratio is near the target air-fuel ratio. A return of the air-fuel ratio correction coefficient to the purge ban interval (from the time A to the time B) before the sailing driving triggers ending of the evaporative fuel concentration learning to purge control during the sailing idling driving. According to this configuration, it is possible to learn the evaporative fuel concentration during the sailing driving, and prevent learning of the evaporative fuel concentration from deteriorating emission and drivability.

REFERENCE SIGNS LIST 101 internal combustion engine
102 throttle
103 intake pipe
104 fuel tank
106 purge valve
109 fuel level meter
112 canister
113 fuel tank pressure/temperature sensor
114 engine controller
401 transmission controller
402 CVT transmission
403 drive wheel
404 internal combustion engine
405 torque converter
406 clutch
407 belt
408 auxiliary machine (generator, and air-conditioner compressor)

The invention claimed is:

1. A control device comprising:
   a purge control unit which controls a purge valve which emits a volatile fuel of a fuel tank or a canister to an intake pipe of an internal combustion engine;
   a power transmission control unit which controls a clutch between the internal combustion engine and a drive wheel; and
   an internal combustion engine control unit which performs sailing stop driving that stops fuel injection to the internal combustion engine during coasting, wherein
   in a state where the power transmission control unit disconnects the clutch, and a vehicle is coasting, the purge control unit opens the purge valve and emits an evaporative fuel to the intake pipe.

2. The control device according to claim 1, wherein the internal combustion engine control unit performs sailing idling driving for maintaining a rotational speed of the internal combustion engine at a predetermined rotational speed during the coasting.

3. The control device according to claim 2, wherein the internal combustion engine control unit sets the predetermined rotational speed higher than an idling rotational speed while the vehicle stops.

4. The control device according to claim 2, wherein the internal combustion engine control unit increases an auxiliary machine load of an air-conditioner output and a generator output during the sailing idling driving compared to idling while the vehicle stops.

5. The control device according to claim 2, wherein the internal combustion engine control unit estimates or measures an evaporative fuel accumulation amount of the canister or a fuel tank evaporative fuel volatilization amount, and controls an idling rotational speed according to the estimation value or the measurement value.

6. The control device according to claim 2, wherein the internal combustion engine control unit increases a speed of an opening degree of the purge valve compared to idling driving while the vehicle stops.

7. The control device according to claim 6, wherein the internal combustion engine control unit increases a feedback response speed of air-fuel ratio control of the internal combustion engine compared to the idling driving while the vehicle stops.

8. The control device according to claim 2, wherein the internal combustion engine control unit, when a purge request is not met, transitions from the sailing idling driving to sailing stop driving.

9. The control device according to claim 8, wherein the internal combustion engine control unit opens the purge valve until the internal combustion engine stops rotating after fuel injection to the internal combustion engine is stopped.

10. The control device according to claim 1, wherein, in a state where the power transmission control unit disconnects the clutch, and the vehicle is coasting, and when an evaporative fuel emission request is made, the purge control unit opens an evaporative fuel valve and purges the evaporative fuel to the intake pipe.

11. The control device according to claim 10, wherein a signal of the evaporative fuel emission request is sent when at least one of a volatile fuel concentration value in the fuel tank, a volatile fuel accumulation value of the canister and an evaporative fuel concentration value emitted from the purge valve becomes a predetermined value or more.

12. The control device of the internal combustion engine according to claim 1, wherein, when a value of an accelerator opening sensor becomes a predetermined value or less, the power transmission control unit disconnects the clutch and the vehicle coasts.

13. The control device according to claim 1, wherein the internal combustion engine control unit, when a sailing condition does not hold, closes the purge valve.

14. The control device according to claim 1, wherein the internal combustion engine control unit, when a volatile fuel concentration value in the fuel tank, a volatile fuel accumulation value of the canister or an evaporative fuel concentration value emitted from the purge valve becomes a predetermined value or less set higher than an evaporative fuel emission request, bans evaporative fuel purge except for sailing driving.

15. The control device according to claim 1, wherein the internal combustion engine control unit, when an evaporative fuel concentration learning request is met, bans evaporative fuel purge except for sailing driving, and learns an evaporative fuel concentration during sailing idling driving.

* * * * *